United States Patent [19]

Belinko et al.

[11] 4,376,695
[45] Mar. 15, 1983

[54] SIMULTANEOUS DEMETALIZATION AND HYDROCRACKING OF HEAVY HYDROCARBON OILS

[75] Inventors: Keith Belinko; David J. Patmore; Rodney H. Packwood; Ramaswami Ranganathan, all of Ottawa, Ontario, Canada

[73] Assignee: Her Majesty the Queen in right of Canada, as represented by the Minister of Energy, Mines and Resources, Ottawa, Ontario, Canada

[21] Appl. No.: 256,855

[22] Filed: Apr. 23, 1981

[30] Foreign Application Priority Data

Feb. 12, 1981 [CA] Canada .................................. 370766

[51] Int. Cl.³ ........................................... C10G 47/10
[52] U.S. Cl. ........................................... 208/59; 208/10; 208/58; 208/251 H
[58] Field of Search .................. 208/58, 10, 59, 251 H

[56] References Cited

U.S. PATENT DOCUMENTS

| | | | |
|---|---|---|---|
| 2,939,835 | 6/1960 | Varga et al. | 208/108 |
| 3,775,296 | 11/1973 | Chervenak et al. | 208/108 |
| 3,844,937 | 10/1974 | Wolf | 208/108 |
| 4,176,051 | 11/1979 | Ternan et al. | 208/112 |
| 4,191,629 | 3/1980 | Chervenak | 208/10 |
| 4,196,072 | 4/1980 | Aldridge et al. | 208/108 X |
| 4,214,977 | 7/1980 | Ranganathan et al. | 208/108 |
| 4,279,736 | 7/1981 | Gleim | 208/39 |
| 4,298,454 | 11/1981 | Aldridge et al. | 208/10 X |
| 4,299,685 | 11/1981 | Khulbe et al. | 208/10 X |

FOREIGN PATENT DOCUMENTS

| | | | |
|---|---|---|---|
| 1073389 | 10/1980 | Canada | 208/108 |
| 829344 | 1/1952 | Fed. Rep. of Germany | 208/108 |

*Primary Examiner*—Delbert E. Gantz
*Assistant Examiner*—G. E. Schmitkons
*Attorney, Agent, or Firm*—Finnegan, Henderson, Farabow, Garrett and Dunner

[57] ABSTRACT

A process is described for the simultaneous demetalization and hydrocracking of heavy hydrocarbon oils. The process permits the recovery of metals such as vanadium and nickel in an economic manner by passing a slurry of a heavy hydrocarbon oil and carbonaceous additive particles, such as coal, in the presence of hydrogen through a confined vertical hydrocracking zone at high temperatures and pressures. A mixed effluent containing a gaseous phase and a liquid phase is removed from the top of a hydrocracking zone, while there is removed from the bottom of the hydrocracking zone a portion of the hydrocracking zone contents containing carbonaceous remains of the additive particles to which is adsorbed the metal residues from the feedstock. The effluent removed from the top of the hydrocracking zone can be subsequently fed directly to a catalytic hydrocracking unit.

7 Claims, 5 Drawing Figures

SIMULTANEOUS DEMETALIZATION AND HYDROCRACKING OF HEAVY HYDROCARBON OILS

This invention relates to hydrocracking and, more particularly, to the simultaneous demetalization and hydrocracking of a heavy hydrocarbon oil, such as bitumen from tar sands.

Hydrocracking processes for the conversion of heavy hydrocarbon oils to light and intermediate naphthas of good quality for reforming feed stock, fuel oil and gas oil are well known. These heavy hydrocarbon oils can be such materials as petroleum crude oil, atmospheric tar bottoms products, vacuum tar bottoms products, heavy cycle oils, shale oils, coal derived fluids, crude oil residuum, topped crude oils and the heavy bituminous oils, such as those extracted from tar sands. Of particular interest are the oils extracted from tar sand which contain wide boiling range materials from naphtha through kerosene, gas oil, pitch, etc., and which contain a large portion, usually more than 50 weight percent of material boiling above 524° C., equivalent atmospheric boiling point.

The heavy hydrocarbon oils of the above type tend to contain nitrogeneous and sulphurous compounds in quite large concentrations. In addition, such heavy hydrocarbon fractions frequently contain excessive quantities of organo-metallic contaminants which tend to be extremely detrimental to various catalytic processes that may subsequently be carried out, such as hydrofining. Of the metallic contaminants, those containing nickel and vanadium are most common, although other metals are often present. These metallic contaminants, as well as others, are chemically bound to organic molecules of relatively high molecular weight which are present in the bituminous material. A considerable quantity of the metal complexes is linked with asphaltenic material and contains sulfur. Of course, in catalytic hydrocracking procedures, the presence of large quantities of asphaltenic material and organically bound metal compounds interferes considerably with the activity of the catalyst with respect to the destructive removal of nitrogen, sulphur and oxygen-containing compounds. A typical Athabasca bitumen may contain 53.76 wt. % material boiling above 524° C., 4.74 wt.% sulphur, 0.59 wt.% nitrogen, 276 ppm vanadium and 80 ppm nickel.

As the reserves of conventional crude oils decline, these heavy oils must be upgraded to meet the demands. In this upgrading, the heavier material is converted to lighter fractions and most of the sulfur, nitrogen and metals must be removed. This is usually done by a coking process such as delayed or fluidized coking or by a hydrogen addition process such as thermal or catalytic hydrocracking. The distillate yield from the coking process is about 70 weight percent and this process also yields about 23 wt.% coke as by-product which cannot be used as fuel because of low hydrogen:carbon ratio, and high mineral and sulfur content. Depending on operating conditions, hydrogenation processes can give a distillate yield of over 87 wt.%.

It has been shown in Ternan et al, Canadian Pat. No. 1,073,389 issued Mar. 10, 1980 and Ranganathan et al., Canadian Pat. No. 4,214,977 issued July 29, 1980, that the addition of coal or coal-based catalyst results in a reduction of coke deposition during hydrocracking and allows operation at low pressures. The coal additives act as sites for the deposition of coke precursors and thus provide a mechanism for their removal from the system.

As has been shown in the above patents, the operating costs can be reduced by using cheap throwaway type catalysts and, for instance, U.S. Pat. No. 4,214,977 describes the use of iron-coal catalyst which enables operation at lower pressures and at higher conversions. The use of coal and Co, Mo and Al on coal catalysts are described in Canadian Pat. No. 1,073,389.

It is the object of the present invention to utilize a relatively inexpensive disposable carbon-based additive in a heavy hydrocarbon feedstock for simultaneous demetalization and hydrocracking of the heavy oil.

SUMMARY OF THE INVENTION

In accordance with the present invention, there is described a process for simultaneous demetalization and hydrocracking of a heavy hydrocarbon oil, a substantial portion of which boils above 524° C., which comprises:

(a) passing a slurry of said heavy hydrocarbon oil and from about 0.01-25 wt. % of carbonaceous additive particles in the presence of hydrogen through a confined vertical hydrocracking zone, said hydrocracking zone being maintained at a temperature between about 400° and 500° C., a pressure of at least 3.5 MPa and a space velocity between about 0.5 and 4 volumes of hydrocarbon oil per hour per volume of hydrocracking zone capacity, (b) removing from the top of said hydrocracking zone a mixed effluent containing a gaseous phase comprising hydrogen and vaporous hydrocarbons and a liquid phase comprising heavy hydrocarbons, and (c) removing from the bottom of said hydrocracking zone a portion of the hydrocracking zone contents containing carbonaceous remains of the additive particles to which is adsorbed metal containing residues from the feedstock.

When a carbonaceous material, such as coal is simultaneously hydrogenated with a heavy hydrocarbon oil, it undergoes liquifaction leaving behind particles consisting of carbonaceous material plus mineral matter which are inert to further hydrogenation. These particles have been found to be active sites for the deposition of metal compounds produced during hydrocracking of heavy hydrocarbon oils. An equilibrium bed of these inert carbonaceous particles is gradually established in the reactor during continuous operation. As vanadium and nickel complexes deposit within the porous network of these particles, they become progressively more dense and settle to the bottom of the reactor. In the present invention, these metal laden particles are withdrawn from the bottom of the reactor while the reactor is fully on stream. These particles have been found to contain as much as 22% vanadium and 6% nickel, making recovery of such metals economically viable.

While the process of this invention is particularly well suited for the treatment of bitumen or heavy oil, it is also very well suited for the treatment of topped bitumen, topped heavy oil or residuum. It can be operated at quite moderate pressures, e.g. in the range of 3.5 to 17.5 MPa, without coke formation in the hydrocracking zone and is preferably carried out in the presence of 500 to 50,000 scf hydrogen per barrel of heavy hydrocarbon oil.

The hydrocracking process of this invention can be carried out in a variety of known reactors with either up or down flow. Thus, the hydrocracking reactor zone can be an empty tubular reactor, an ebullated bed reactor or a fluidized bed reactor. The empty tubular reactor has been found to be particularly convenient with the effluent from the top being separated in a hot separator and the gaseous stream from the hot separator being fed to a low temperature-high pressure separator where it is separated into a gaseous stream containing hydrogen and lesser amounts of gaseous hydrocarbons and a liquid product stream containing light oil products. It is also possible to have the reactors in stages where the first reactor is an empty tubular reactor and the second reactor contains an ebullated bed of catalyst extrudates, e.g. a hydrogenating catalyst.

Another arrangement is to have two stages within a single vessel, the first stage being an ebullated bed for demetalization and the second stage being a fixed or ebullated bed for catalytic hydrocracking.

The carbonaceous additive particles can be selected from a wide range of materials, with their main requirement being that they be capable of providing a porous network for the deposition of the metal-rich residues from hydrocracking of the heavy hydrocarbon oils. Coals are particularly well suited for this purpose, with sub-bituminous coal being particularly preferred. Other carbonaceous additives that may be used include a fly ash obtained from burning of delayed bitumen coke. This fly ash contains in excess of 20% unburnt carbon and has been found to be highly porous. Other additives may include coal washery rejects, pulverized coke, lignite and anthracites.

The carbonaceous additive can be used as is without any additive or it may be coated with up to about 10 wt. % of metal salts such as iron, cobalt, molybdenum, zinc, tin, tungsten, nickel or other catalytically active salts. The use of the catalytic materials improve the conversion of heavy oil as well as the operability of the process, but the metal loading must depend on the cost of materials, tolerable ash content and optimum catalyst activity.

The catalyst can be coated on the carbonaceous particles by spraying the aqueous solution of the metal salt on the coal particles. The particles are then dried to reduce the moisture content before blending with the feed stock.

The carbonaceous, e.g, coal particles used may be quite small, e.g usually less than 60 mesh (Canadian Standard Sieve) and it is particularly preferred to use a material which will pass through a 100 mesh sieve. The additive should be mixed with the bitumen in such a manner as to avoid formation of lumps and, if desired, additional homogeneous and heterogeneous catalysts may be mixed with the additive bitumen slurry.

The presence of the additive particles in the slurry, as stated above, suppresses coke formation during hydrocracking. The result is that the simultaneous coal-bitumen hydrocracking can be performed at quite low pressures. Nevertheless, in certain situations it is desirable to operate at higher pressures so as to maximize liquid yields as well as product quality.

According to a preferred embodiment, the bitumen and additive, e.g. coal, are mixed in a feed tank and pumped with hydrogen through a heater and a vertical empty tube reactor. The liquid-gas mixture from the top of the hydrocracking zone is separated in a hot separator maintained at a temperature in the range of about 200°–470° C. and at the pressure of the hydro-cracking zone. The heavy hydrocarbon product from the hot separator can be partially recycled to the hydrocracking zone or sent to secondary treatment.

The gaseous stream from the hot separator containing a mixture of hydrocarbon gases and hydrogen is further cooled and separated in a low temperature-high pressure separator. By using this type of separator, the outlet gaseous stream obtained contains mostly hydrogen with some impurities such as hydrogen sulfide and light hydrocarbon gases. This gaseous stream is passed through a scrubber and the scrubbed hydrogen is recycled as part of the hydrogen feed to the hydrocracking process. The recycled hydrogen gas purity is maintained by adjusting scrubbing conditions and by adding make-up hydrogen.

The liquid stream from the low temperature-high pressure separator represents the light hydrocarbon product of the present process and can be sent for secondary treatment.

According to another preferred embodiment, the present invention relates to a sequential demetalization and catalytic hydrocracking process wherein the demetalized gas-liquid mixture effluent from a first stage hydrocracking zone is fed directly to a catalytic hydrocracking unit. In this procedure, sufficient demetalization of the feedstock occurs in the primary stage that the life of the catalyst is considerably extended in the second stage. The metal laden additive is removed from the bottom of the first stage hydrocracking zone.

For a better understanding of the present invention, reference is made to the accompanying drawings in which.

Figure 1:
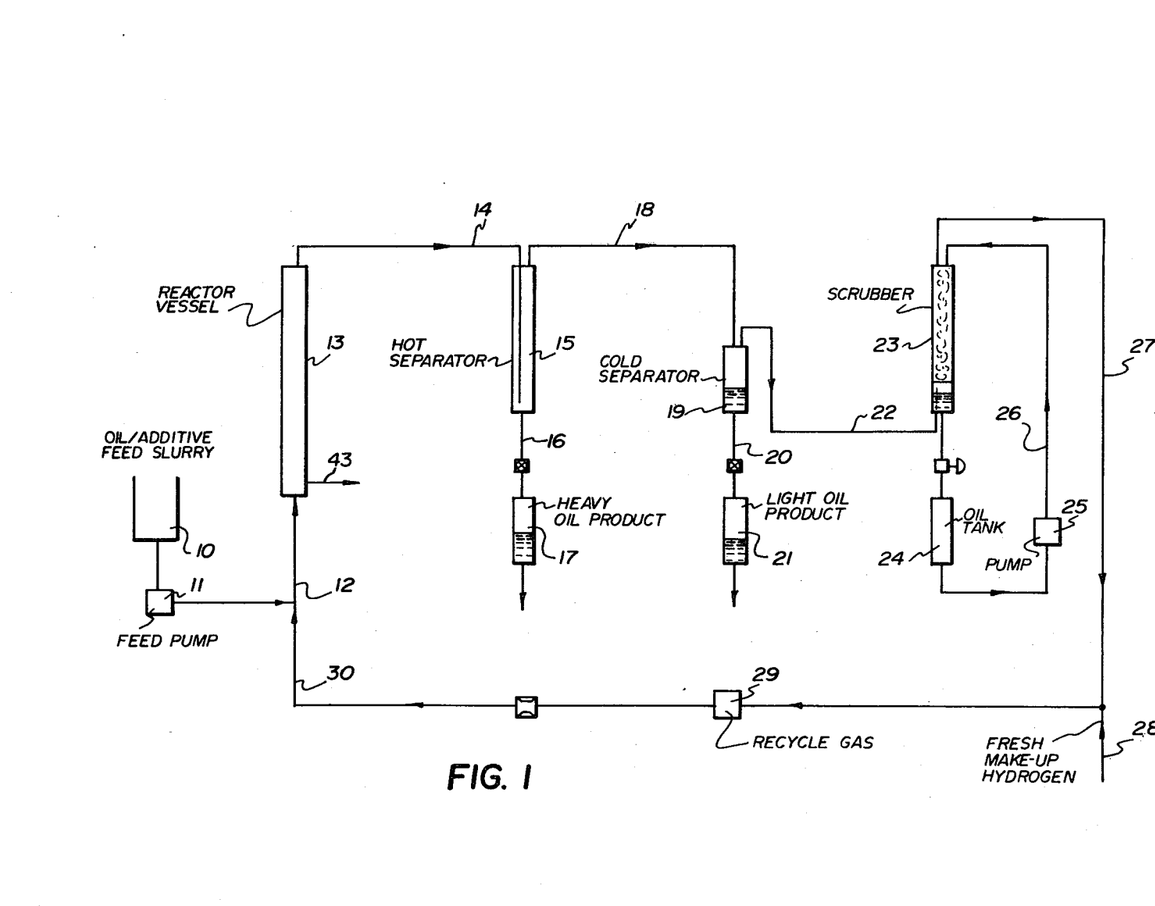
FIG. 1 is a schematic flow sheet of one preferred embodiment of the invention.

As shown in FIG. 1, heavy hydrocarbon oil feed and coal or other carbonaceous additive are mixed together in a feed tank 10 to form a slurry. This slurry is pumped via feed pump 11 through inlet line 12 into the bottom of an empty tower 13. Recycled hydrogen and make up hydrogen from line 30 in simultaneously fed into the tower 13 through line 12. The metal-laden additive is withdrawn from the bottom of tower 13 through line 43. A gas-liquid mixture is withdrawn from the top of the tower through line 14 and introduced into a hot separator 15. In the hot separator the effluent from tower 13 is separated into a gaseous stream 18 and a liquid stream 16, The liquid stream 16 is in the form of heavy oil which is collected at 17.

The gaseous stream from hot separator 15 is carried by way of line 18 into a high pressure-low temperature separator 19. Within this separator the product is separated into a gaseous stream rich in hydrogen which is drawn off through line 22 and an oil product which is drawn off through line 20 and collected at 21.

The hydrogen rich stream 22 is passed through a packed scrubbing tower 23 where it is scrubbed by means of a scrubbing liquid 24 which is cycled through the tower by means of pump 25 and recycle loop 26. The scrubbed hydrogen rich stream emerges from the scrubber via line 27 and is combined with fresh make up hydrogen added through line 28 and recycled through recycle gas pump 29 and line 30 back to tower 13.

Figure 2:
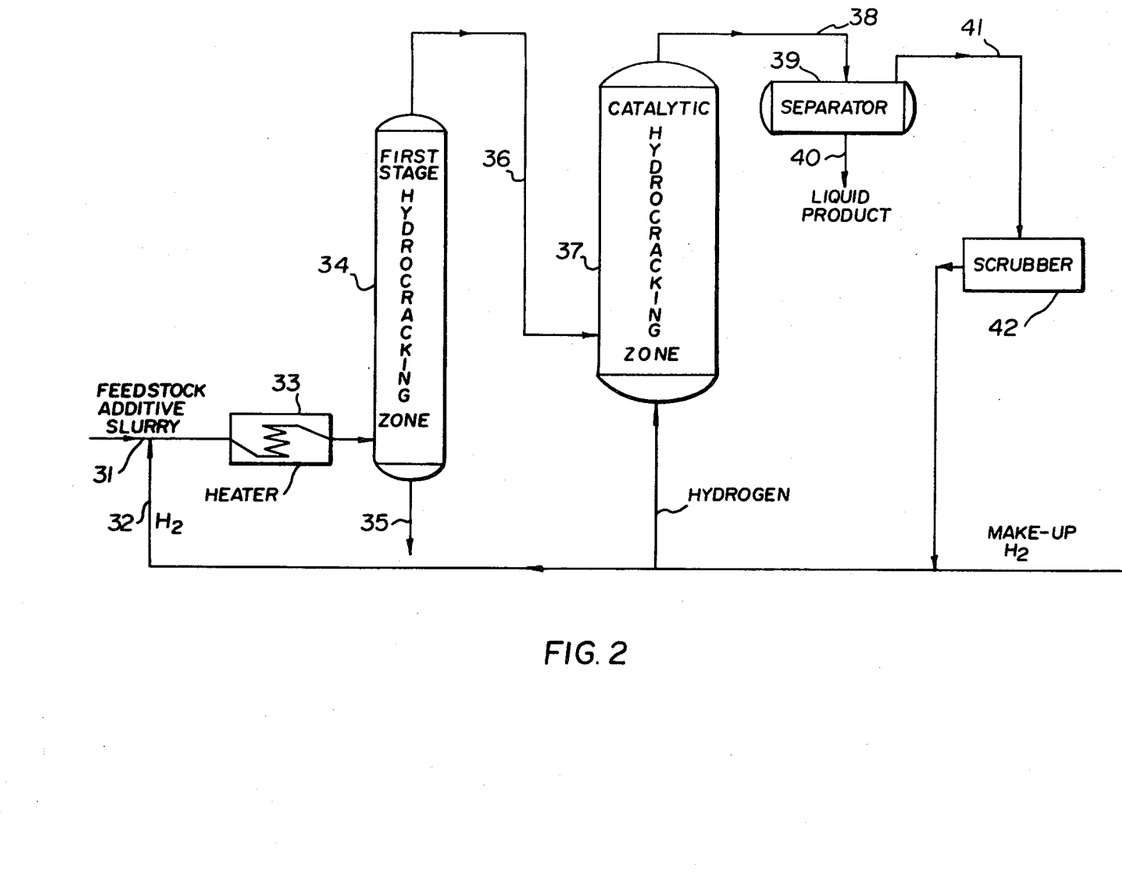
FIG. 2 is a schematic flow sheet of a second preferred embodiment of the invention.

In the embodiment shown in FIG. 2, a slurry of heavy hydrocarbon oil feed and coal or other carbonaceous additive 31 is fed together with recycled and fresh hydrogen 32 through a heater 33 and into the bottom of a first stage hydrocracking zone 34. The metal-laden additive is withdrawn from the bottom of the first stage hydrocracking zone through outlet line 35. The gas-liquid effluent is removed from the top of the first stage hydrocracking zone through overhead line 36 and introduced directly into the catalytic hydrocracking zone 37. The effluent from the catalytic hydrocracking zone 37 is drawn off at the top through overhead line 38 and is fed into a low pressure separator 39 where the product is separated into a hydrogen rich gaseous stream 41 and liquid products 40. The gaseous stream is passed through a scrubber 42 and is used as part of the hydrogen feed.

Figure 3:
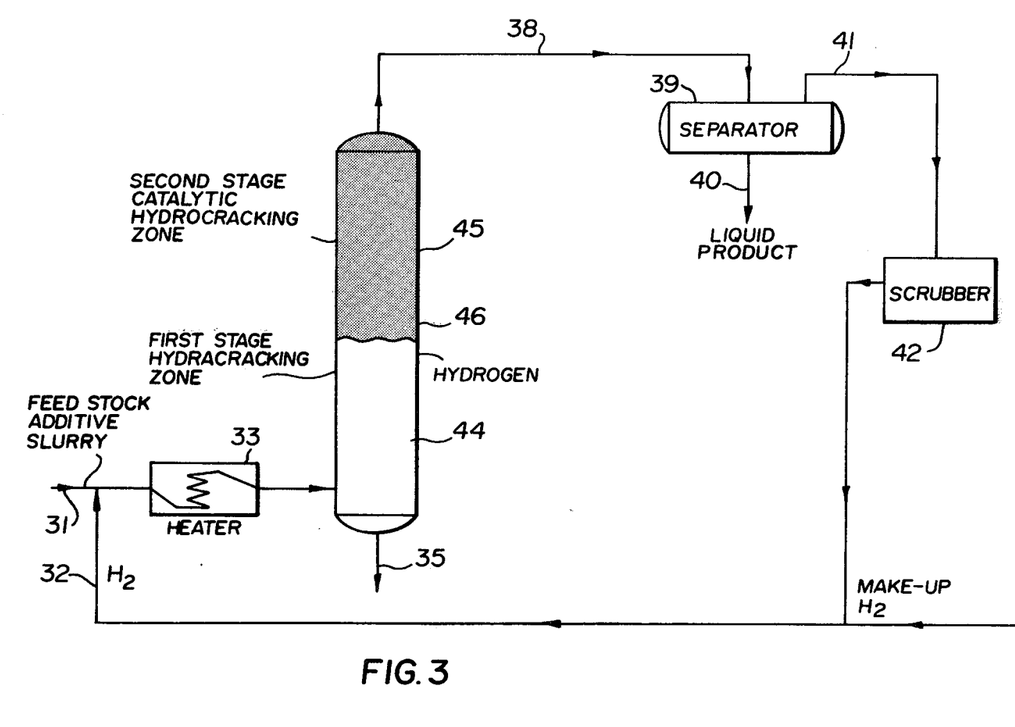
FIG. 3 is a schematic flow sheet of a further preferred embodiment of the invention.

FIG. 3 shows an embodiment similar to that of FIG. 2, but in place of two hydrocracking vessels, a single vessel 46 is used. This is divided into a lower first stage, hydrocracking zone 44 and an upper second stage catalytic hydrocracking zone 45. The first stage 44 is an empty tubular or ebullated bed reactor and the second stage 45 is in the form of a fixed bed or ebullated bed of hydrogenation catalyst.

A slurry of heavy hydrocarbon oil feed and carbonaceous additive 31 is fed together with recycled and fresh hydrogen 32 through a heater 33 and into the bottom of the first stage hydrocracking zone 44. The metal-laden additive is withdrawn from the bottom of the first stage through outlet line 35, while the rising gas-liquid product passes upwardly through the second stage catalytic hydrocracking zone 45. The effluent from the second stage 45 is drawn off at the top through overhead line 38 and is fed into a low pressure separator 39 where the product is separated into a hydrogen rich gaseous stream 41 and liquid products 40. The gaseous stream is passed through a scrubber 42 and is used as part of the hydrogen feed.

Certain preferred embodiments of this invention will now be further illustrated by the following non-limitative examples. For these examples two different feedstocks were used, one being an Athabasca bitumen obtained from Great Canadian Oil Sands Ltd. and the other being Cold Lake Vacuum Residuum obtained from Imperial Oil Ltd. The properties of the above feedstocks are given in Table 1.

TABLE 1
Properties of Feedstocks

| | | Feedstock A* | Feedstock CL** |
|---|---|---|---|
| Specific gravity | 15/15° C. | 1.013 | 1.026 |
| Sulphur | wt % | 4.74 | 5.16 |
| Nitrogen | wt % | 0.59 | 0.57 |
| Ash | wt % | 0.59 | 0.06 |
| Viscosity at 99° C. | cst | 213 | 1489 |
| Conradson Carbon Residue | wt % | 14.9 | 18.2 |
| Pentane-insolubles | wt % | 16.8 | 21.0 |
| Benzene-insolubles | wt % | 0.52 | 0.03 |
| Nickel | ppm | 80 | 92 |
| Vanadium | ppm | 276 | 255 |
| Pitch Content (524° C.+) | wt % | 53.76 | 72.95 |

*Athabasca bitumen
**Cold Lake Vacuum Residuum

The additive used was a sub-bituminous coal which was crushed and screened to provide a minus 100 mesh material. The coal additive was used as is or treated with metal salts. This can be done by spraying an aqueous solution of the metal salt on the coal particles and then drying the coal to reduce the moisture content before blending with the feedstock.

The properties of the coal used and the coal with various treating agents applied are set out in Table 2 below.

TABLE 2
Analysis of Additives

Additive A (Sub-bituminous C)

| Ultimate and Proximate Analysis | | Ash Analysis | |
|---|---|---|---|
| | % (db) | | % |
| Ash | 9.5 | $SiO_2$ | 38.2 |
| Volatile matter | 51.3 | $Al_2O_3$ | 22.6 |
| Fixed Carbon | 39.2 | $Fe_2O_3$ | 7.70 |
| Carbon | 67.1 | $TiO_2$ | 1.54 |
| Hydrogen | 4.0 | $P_2O_5$ | 0.24 |
| Sulphur | 0.2 | CaO | 18.5 |
| Nitrogen | 0.9 | MgO | 2.37 |
| | | $K_2O$ | 0.21 |

Additive B (Coal/FeSO4)

| | | |
|---|---|---|
| Sulphur | wt % | 3.61 |
| Carbon | wt % | 49.19 |
| Hydrogen | wt % | 3.57 |
| Nitrogen | wt % | 0.62 |
| Vanadium | ppm | 5 |
| Nickel | ppm | 13 |
| Iron | wt % | 5.8 |
| Titanium | ppm | 718 |

Additive C (Co—Mo—Al/coal)

| | | |
|---|---|---|
| Sulphur | wt % | 0.24 |
| Carbon | wt % | 50.70 |
| Hydrogen | wt % | 3.67 |
| Nitrogen | wt % | 1.69 |
| Vanadium | ppm | 7 |
| Nickel | ppm | 20 |
| Iron | wt % | 0.56 |
| Cobalt | wt % | 0.57 |
| Molybdenum | wt % | 0.86 |
| Titanium | ppm | 65.4 |

Additive D (Co—Mo/coal)

| | | |
|---|---|---|
| Sulphur | wt % | 0.22 |
| Carbon | wt % | 62.81 |
| Hydrogen | wt % | 3.08 |
| Nitrogen | wt % | 1.20 |
| Vanadium | ppm | nil |
| Nickel | ppm | 30 |
| Iron | wt % | 0.62 |
| Cobalt | wt % | 0.56 |
| Molybdenum | wt % | 0.90 |
| Titanium | ppm | 402 |

EXAMPLE 1

A blended slurry of Feedstock CL (Cold Lake Vacuum residuum) and 1% by weight of the Additive B (coal/FeSO4) was prepared and this slurry was used as a feedstock to a hydrocracking plant as illustrated in FIG. 1 of the drawings. The pilot plant used the reaction sequence shown in the drawing with a reactor vessel having a height of 4.3 m and was operated under the following reaction conditions:

| | |
|---|---|
| Reactor temperature, °C. | 448 |
| Reaction pressure, MPa | 13.89 |
| LHSV | 0.75 |
| $H_2$ rate, m³/h | 6.09 |
| Length of run, h | 729 |

The results obtained from this run were as follows:

| | |
|---|---|
| Pitch conversion, wt % | 88.3 |
| Sulphur conversion, wt % | 60.8 |
| Product Yield, wt % | 91.3 |
| Product specific gravity | 0.891 |
| $H_2$ consumption, $m^3$/tonne | 218.57 |

Withdrawal of material from the reactor was accomplished through sampling ports located at the mid-point and at the bottom of reactor vessel 13. While the system was fully on stream, approximately 200 g of reactor fluid was sampled at any one time. On completion of the run samples of the additive bed which had been allowed to build up in the reactor during the run, were also collected for analysis. All samples were subjected to extraction with toluene. The toluene insoluble solids were mounted in epoxy resin and polished for a microscopic examination and electron microprobe analyses.

Figure 4:
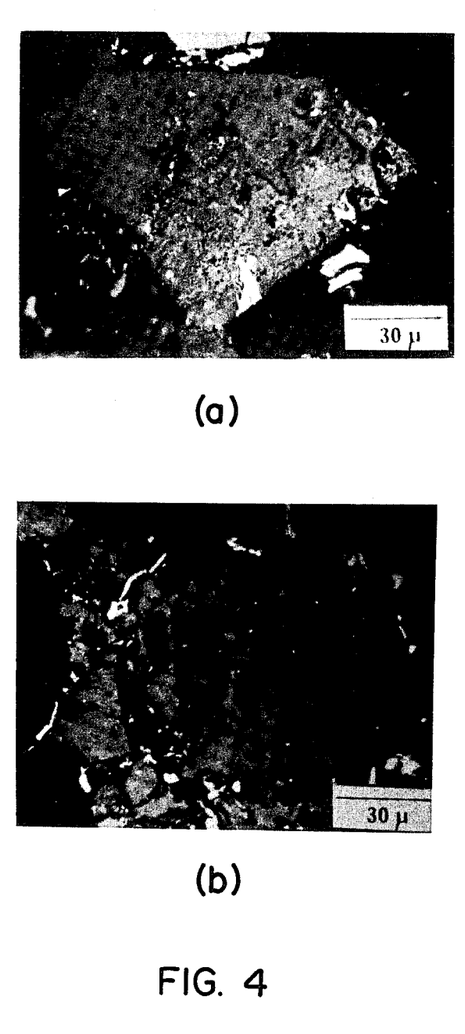
FIG. 4 shows two optical micrographs of a fresh coal/$FeSO_4$ catalyst additive.
Figure 5:
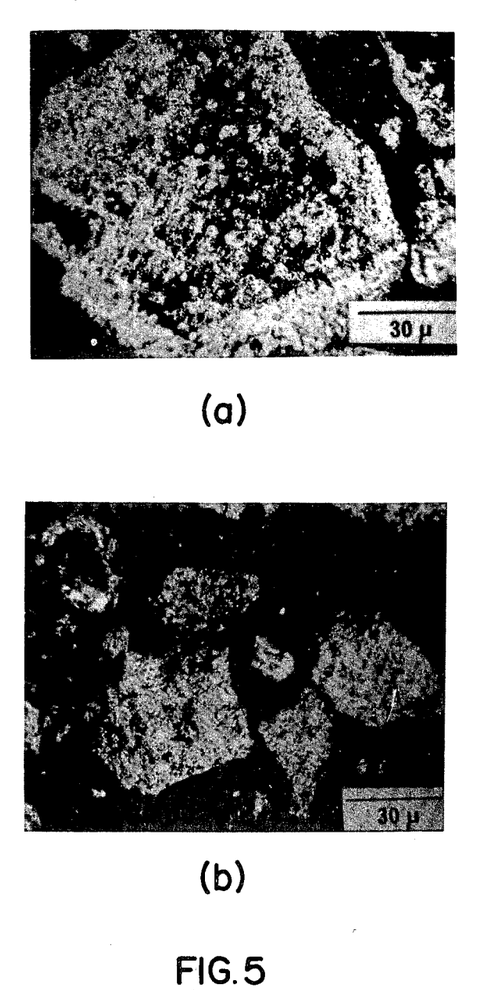
FIG. 5 is two optical micrographs of the catalyst additive of FIG. 3 with deposited metals.

FIGS. 4a and 4b show optical micrographs of original particles of $FeSO_4$/coal, while FIGS. 5a and 5b show particles of the same additive after having been subjected to hydrocracking conditions in the presence of bitumen. In the latter case, the particles are seen to be concentrated with fine granular material. Typical electron microprobe analyses of the original $FeSO_4$/coal additive and of additive particles which have been subjected to hydrocracking conditions in the presence of bitumen are given in Table 3 below.

TABLE 3

Electron-Microprobe Analyses

Concentration, wt %
Particle

| | 1 | 2 | 3 | 4 | 5 |
|---|---|---|---|---|---|
| (a) Fresh Additive B (Coal/$FeSO_4$) | | | | | |
| Magnesium | 0.1433 | 0.1243 | 0.1219 | 0.0175 | 0.2493 |
| Aluminum | 0.2169 | 0.2316 | 0.2046 | 0.1889 | 0.1575 |
| Silicon | 0.1525 | 0.1869 | 0.1680 | 0.1052 | 0.1082 |
| Sulphur | 2.7128 | 2.4921 | 2.5959 | 3.4877 | 3.2150 |
| Potassium | 0.0000 | 0.0210 | 0.0020 | 0.0129 | 0.0046 |
| Calcium | 0.0216 | 0.0659 | 0.0722 | 0.0504 | 0.0355 |
| Vanadium | 0.0195 | 0.0028 | 0.0302 | 0.0000 | 0.0000 |
| Iron | 4.4130 | 3.4551 | 5.0149 | 5.6284 | 4.5909 |
| Nickel | 0.0213 | 0.0000 | 0.0123 | 0.0000 | 0.0000 |
| (b) Used Additive B (Coal/$FeSO_4$) | | | | | |
| Magnesium | 0.6287 | 0.3080 | 0.5823 | 0.5455 | 0.6087 |
| Aluminum | 0.9710 | 0.4831 | 0.7695 | 0.5783 | 2.2161 |
| Silicon | 0.6584 | 0.5733 | 0.9334 | 0.5653 | 0.4165 |
| Sulphur | 16.6476 | 14.4393 | 16.7598 | 12.7237 | 7.7197 |
| Calcium | 0.5359 | 0.2523 | 0.5188 | 0.2825 | 0.5577 |
| Vanadium | 11.0432 | 7.8674 | 9.8838 | 6.3822 | 4.6756 |
| Iron | 8.4448 | 5.2211 | 7.0676 | 7.2507 | 4.5422 |
| Nickel | 2.0762 | 1.8913 | 2.2727 | 1.5000 | 1.1879 |

The fresh additive particles contained no detectable levels of vanadium or nickel, while the particles which were present during the hydrocracking process contained as much as 12% by weight vanadium and and 3% by weight nickel. Total demetalization generally achieved during the hydrocracking process was in excess of 95%.

EXAMPLE 2

The procedure of Example 1 was repeated, this time using Feedstock A (Athabasca bitumen) and 1% by weight of Additive A (sub-bituminous coal without treatment). Three trials were carried out on the pilot plant under the following reaction conditions:

| | Run 1 | Run 2 | Run 3 |
|---|---|---|---|
| Reactor temperature, °C. | 440 | 450 | 455 |
| Reaction pressure, MPa | 10.44 | 10.44 | 10.44 |
| LHSV | 1.0 | 1.0 | 1.0 |
| $H_2$ rate (P, 15° C.), $m^3$/h | 4.19 | 4.19 | 4.19 |
| Length of run, h | 112 | 114 | 119 |

Runs 1, 2 and 3 were consecutive runs lasting a total of 345 hours. During the runs, the solids and metals accumulation in the reactor fluid was monitored by sampling at the bottom and middle of the reactor. The conversion data for the three runs is as follows:

| | Run 1 | Run 2 | Run 3 |
|---|---|---|---|
| Pitch conversion, wt % | 71.80 | 80.90 | 84.70 |
| Sulphur conversion, wt % | 41.30 | 50.80 | 52.50 |
| Product Yield, wt % | 94.20 | 92.90 | 91.90 |
| Product sp. gravity, 15/15° C. | 0.940 | 0.921 | 0.914 |
| $H_2$ consumption, $m^3$/ton | 117.11 | 138.13 | 167.30 |

The samplings taken from the bottom and middle of the reactor during the runs were subjected to an analyses and the results are given in Table 4 below:

TABLE 4

| | BOTTOM OF THE REACTOR Day | | | | MIDDLE OF THE REACTOR Day | | | |
|---|---|---|---|---|---|---|---|---|
| | 1 | 6 | 10 | 15 | 1 | 6 | 10 | 15 |
| Toluene-insoluble, wt % | 13.6 | 29.7 | 36.0 | 39.9 | 11.4 | 16.1 | 19.8 | 31.9 |
| Pentane-insoluble, wt % | 28.9 | 43.2 | 48.6 | 52.7 | 26.5 | 31.6 | 33.0 | 46.0 |
| Ash, wt % | 6.8 | 19.2 | 24.8 | 28.0 | 4.5 | 8.1 | 11.5 | 18.5 |
| Metals content in the toluene-insoluble portion | | | | | | | | |
| Vanadium, wt % | 0.9 | 7.1 | 9.4 | 10.2 | 1.0 | 3.8 | 5.6 | 9.0 |
| Nickel wt % | 0.3 | 1.3 | 1.5 | 1.7 | 0.3 | 0.6 | 0.9 | 1.3 |
| Iron, wt % | 3.7 | 4.1 | 4.3 | 4.2 | 3.5 | 4.0 | 4.3 | 4.0 |
| Cobalt, wt % | — | — | — | — | — | — | — | — |
| Molybdenum wt % | — | — | — | — | — | — | — | — |

EXAMPLE 3

The same procedure followed in Example 1 was repeated, using feedstock A (Athabasca bitumen) with 0.5% by weight of Additive C (Co, Mo, Al/coal catalyst. Two runs were carried out on the pilot plant under the following reaction conditions.

| | Run 1 | Run 2 |
|---|---|---|
| Reactor temperature, °C. | 460 | 460 |
| Reaction pressure, MPa | 13.39 | 13.89 |
| LHSV | 2.0 | 2.0 |
| $H_2$ rate (P, 15° C., $m^3$/h) | 5.49 | 5.49 |
| Length of run, h | 265 | 240 |

The results obtained from the above runs were as follows:

| | Run 1 | Run 2 |
|---|---|---|
| Pitch conversion, wt % | 78.3 | 79.9 |
| Sulphur conversion, wt % | 73.0 | 70.7 |
| Product yield, wt % | 93.4 | 90.0 |
| Product gravity, 15/15° C. | 0.914 | 0.913 |

-continued

|  | Run 1 | Run 2 |
|---|---|---|
| $H_2$ consumption m³/tonne | 170.19 | 159.03 |

The solids and metal accumulation in the reactor fluid was monitored by sampling at the bottom and middle of the reactor during the above runs. These reactor fluid samples were subjected to analyses and the results are shown in Table 5 below:

TABLE 5

|  | BOTTOM OF THE REACTOR Day | | | | MIDDLE OF THE REACTOR Day | | | |
|---|---|---|---|---|---|---|---|---|
|  | 1 | 10 | 15 | 21 | 1 | 10 | 15 | 21 |
| Toluene-insoluble, wt % | 43.8 | 58.5 | 65.3 | 61.8 | 12.9 | 56.6 | 72.2 | 71.6 |
| Pentane-insoluble, wt % | 54.2 | 70.2 | 72.8 | 70.4 | 24.8 | 62.0 | 77.0 | 76.2 |
| Ash, wt % | 37.0 | 54.7 | 56.7 | 52.6 | 7.58 | 42.5 | 57.7 | 56.8 |
| Metals content in the toluene-insoluble portion | | | | | | | | |
| Vanadium, wt % | 4.5 | 20.1 | 21.6 | 22.0 | 3.1 | 9.25 | 11.8 | 14.8 |
| Nickel wt % | 0.80 | 4.4 | 5.3 | 5.9 | 0.53 | 1.8 | 2.4 | 3.0 |
| Iron, wt % | 2.2 | 3.2 | 2.5 | 2.0 | 3.2 | 1.7 | 1.6 | 1.6 |
| Cobalt, wt % | 0.64 | 0.67 | 0.59 | 0.54 | 0.86 | 0.55 | 0.54 | 0.53 |
| Molybdenum, wt % | 3.2 | 2.7 | 2.2 | 5.5 | 2.4 | 2.9 | 2.4 | 4.5 |

It will be seen from the above table that the vanadium and nickel content of the toluene-insoluble portion of the reactor fluid increased as a function of operating time in days. The vanadium and nickel concentrations reached 22.0 wt% and 5.9 wt% respectfully after 21 days of operation. The toluene-insoluble and metals concentrations were consistently lower in the middle portion of the reactor than in the bottom. This distribution confirms that a settling effect of denser particles was responsible for the accumulation phenomenon.

We claim:

1. A process for simultaneous demetalization and hydrocracking of a heavy hydrocarbon oil, a substantial portion of which boils above 524° C., which comprises:

(a) passing a slurry of said heavy hydrocarbon oil and from about 0.01 to 25 wt % of carbonaceous additive particles in the presence of hydrogen through a confined vertical hydrocracking zone, said hydrocracking zone being maintained at a temperature between about 400° and 500° C., a pressure of at least 3.5 MPa and a space velocity of up to 4 volumes of hydrogen oil per hour per volume of hydrocracking zone capacity, (b) causing the carbonaceous particles within the hydrocracking zone to undergo partial liquifaction leaving porous particles of carbonaceous material and mineral matter which are inert to further hydrogenation and depositing within the porous network of said porous particles metal-containing residues from the feedstock, thereby causing said porous particles to increase in density and settle to the bottom of the hydrocracking zone, (c) removing from the top of said hydrocracking zone a mixed effluent containing a gaseous phase comprising hydrogen and vaporous hydrocarbons and a liquid phase comprising heavy hydrocarbons, and (d) removing from the bottom of said hydrocracking zone a portion of the hydrocracking zone contents containing said porous particles with adsorbed metal-containing residues from the feedstock.

2. A process according to claim 1 wherein demetalized effluent removed from the top of the hydrocracking zone is passed through a second vertical hydrocracking zone containing a hydrogenation catalyst.

3. A process according to claim 1 wherein the hydrocracking zone is a single vessel having an ebullated bed for demetalization and a fixed or ebullated bed for catalytic hydrocracking.

4. A process according to claim 1 wherein the carbonaceous additive particles are coal particles.

5. A process according to claim 4 wherein the coal is minus 60 mesh (Canadian sieve).

6. A process according to claim 4 wherein the coal is coated with up to about 10 wt % of a metal salt catalyst.

7. A process according to claim 6 wherein the metal salt is a salt of iron, cobalt, molybdenum, zinc, tin, nickel or tungsten.

* * * * *